(12) United States Patent
Bordes et al.

(10) Patent No.: US 12,167,001 B2
(45) Date of Patent: Dec. 10, 2024

(54) LOCAL ILLUMINATION COMPENSATION FLAG INHERITANCE

(71) Applicant: InterDigital CE Patent Holdings, SAS, Paris (FR)

(72) Inventors: Philippe Bordes, Laille (FR); Franck Galpin, Thorigne-Fouillard (FR); Ya Chen, Rennes (FR); Fabrice Urban, Thorigne Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 225 days.

(21) Appl. No.: 17/621,549

(22) PCT Filed: Jun. 18, 2020

(86) PCT No.: PCT/EP2020/066975
§ 371 (c)(1),
(2) Date: Dec. 21, 2021

(87) PCT Pub. No.: WO2020/254500
PCT Pub. Date: Dec. 24, 2020

(65) Prior Publication Data
US 2022/0353517 A1    Nov. 3, 2022

(30) Foreign Application Priority Data

Jun. 21, 2019 (EP) .................... 19305804

(51) Int. Cl.
*H04N 19/00* (2014.01)
*H04N 19/136* (2014.01)
(Continued)

(52) U.S. Cl.
CPC ......... *H04N 19/186* (2014.11); *H04N 19/136* (2014.11); *H04N 19/176* (2014.11); *H04N 19/42* (2014.11); *H04N 19/70* (2014.11)

(58) Field of Classification Search
CPC .. H04N 19/186; H04N 19/136; H04N 19/176; H04N 19/42; H04N 19/70
See application file for complete search history.

(56) References Cited

U.S. PATENT DOCUMENTS

| 10,887,597 B2 | 1/2021 | Liu et al. |
| 2008/0130750 A1 | 6/2008 | Song |

(Continued)

FOREIGN PATENT DOCUMENTS

| CN | 101193302 A | 6/2008 |
| CN | 107710764 A | 2/2018 |

(Continued)

OTHER PUBLICATIONS

Liu et al., "Local Illumination Compensation", ITU—Telecommunication Standarization Sector, Study Group 16, Question 6, Video Coding Experts Group (VCEG), Document VCEG-AZ06, 52nd Meeting, Warsaw, Poland, Jun. 19, 2015, 4 pages.

(Continued)

*Primary Examiner* — Zhihan Zhou
(74) *Attorney, Agent, or Firm* — Condo Roccia Koptiw LLP

(57) ABSTRACT

A method and apparatus to improve compression efficiency in a video compression scheme enables flexible use of local illumination compensation. Such methods comprise individual local illumination compensation for components of a video block. Such methods also comprise flexible derivation methods for illumination compensation information. In one embodiment, local illumination compensation information (Continued)

can be inherited from other others, such as neighboring blocks.

18 Claims, 16 Drawing Sheets

(51) Int. Cl.
    *H04N 19/176*      (2014.01)
    *H04N 19/186*      (2014.01)
    *H04N 19/42*      (2014.01)
    *H04N 19/70*      (2014.01)

(56) References Cited

U.S. PATENT DOCUMENTS

| | | | |
|---|---|---|---|
| 2016/0366416 A1* | 12/2016 | Liu | G06T 7/246 |
| 2018/0098062 A1 | 4/2018 | Li et al. | |
| 2019/0215522 A1* | 7/2019 | Zhang | H04N 19/159 |
| 2020/0186830 A1* | 6/2020 | Seregin | H04N 19/159 |
| 2020/0221111 A1* | 7/2020 | Seregin | H04N 19/46 |
| 2021/0051345 A1* | 2/2021 | Tsai | H04N 19/176 |

FOREIGN PATENT DOCUMENTS

| | | |
|---|---|---|
| CN | 109792526 A | 5/2019 |
| EP | 3484159 A1 | 5/2019 |

OTHER PUBLICATIONS

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.
Anonymous, "Information Technology—Generic Coding of Moving Pictures and Associated Audio Information: Systems", International Organization for Standardization (ISO) and the International Electrotechnical Commission, (IEC), Document: ISO/IEC 13818-1, Fifth edition, Jul. 11, 2014, 131 pages.
Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document: ISO 13818-2: 1995 (E), 1995, 255 pages.
ITU-T, "High Efficiency Video Coding", Recommendation ITU-T H.265, Series H: Audiovisual and Multimedia Systems, Infrastructure of Audiovisual Services—Coding of Moving Video, Apr. 2013, 317 pages.

\* cited by examiner

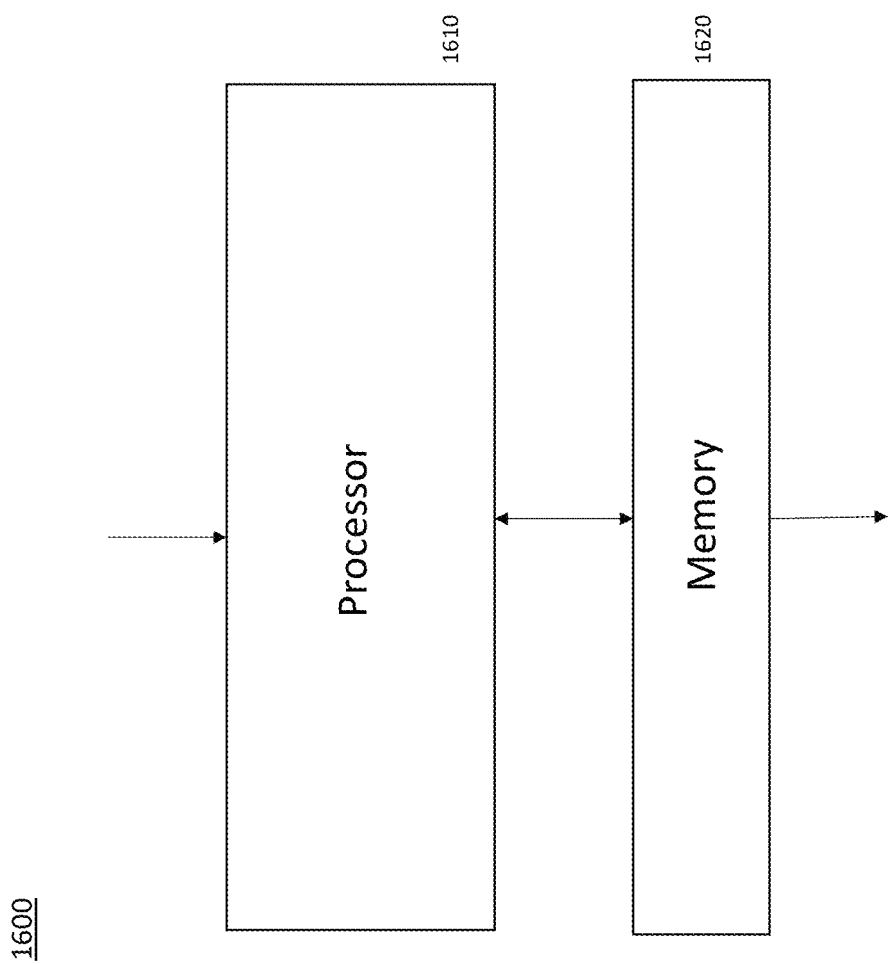

LOCAL ILLUMINATION COMPENSATION FLAG INHERITANCE

CROSS-REFERENCE TO RELATED APPLICATIONS

This application is a U.S. national stage application filed under 35 U.S.C. 371 of International Application No. PCT/EP2020/066975, filed Jun. 18, 2020, which is a non-provisional filing of, and claims priority to and the benefit of European Patent Application No. 19305804.7, filed Jun. 21, 2019, the entire contents of each of which are incorporated herein by reference as if fully set-forth herein in their respective entirety, for all purposes.

FIELD OF THE INVENTION

The present disclosure relates to video compression and more particularly to performing video coding and decoding.

BACKGROUND OF THE INVENTION

Many attempts have been made to improve the coding efficiency of block-based codecs. Local illumination compensation (LIC) is a tool introduced for this purpose. In the Joint Exploration Model (JEM) and in the VVC reference software developed by the JVET (Joint Video Exploration Team) group, some additional temporal prediction tools with associated parameters determined at the decoder side are under study, including Local Illumination Compensation (LIC). Basically, the purpose of LIC is to compensate for illumination change which may occur between a predicted block and its reference block employed through motion compensated temporal prediction.

SUMMARY OF THE INVENTION

These and other drawbacks and disadvantages of the prior art are addressed by the present described embodiments, which are directed to a method and apparatus to manage a trade-off between the coding efficiency provided by FRUC tools and its complexity.

According to an aspect of the described embodiments, there is provided a method. The method comprises steps for determining local illumination compensation information to be used for one or more video components of a video block; encoding the video block using the local illumination compensation information; and, indicating in a bitstream whether said illumination compensation information are used for the video block.

According to another aspect of the described embodiments, there is provided a second method. The method comprises steps for parsing a bitstream for syntax information indicative of local illumination compensation; and, decoding at least one video block in said bitstream based on said syntax to conditionally perform local illumination compensation on components of said one video block.

According to another aspect of the described embodiments, there is provided an apparatus. The apparatus comprises a memory and a processor. The processor can be configured to encode or decode a portion of a video signal by any of the above mentioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 16 illustrates one embodiment of an apparatus for encoding or decoding video using at least one illumination compensation flag.

DETAILED DESCRIPTION

The domain of the embodiments described herein is video compression, intended to improve the video compression efficiency of state of the art video coding schemes. They aim at improving compression efficiency compared to existing video compression systems based on hybrid architecture and implementing efficient local illumination compensation.

Block-Based Video Compression

Figure 1:
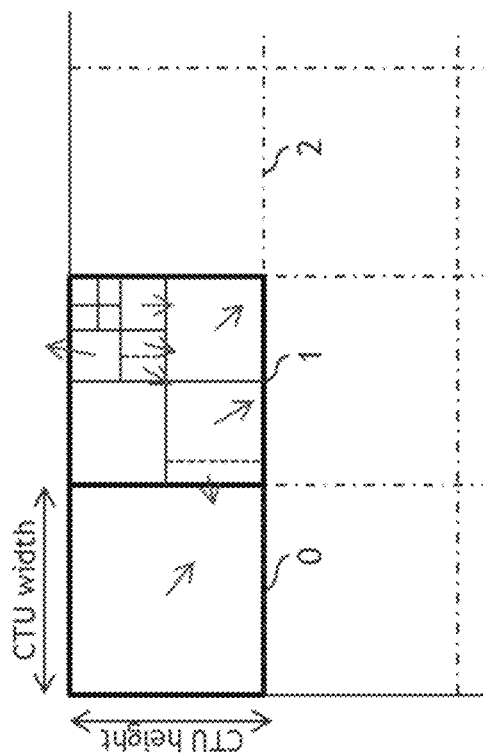
FIG. 1 illustrates Coding Tree Unit and Coding Tree concepts to represent a compressed HEVC picture.

In HEVC (High Efficiency Video Coding, ITU-T H.265) or Versatile Video Codec (VVC of Joint Video Experts Team), for coding a picture, the frame is first split into large blocks (CTU=Coding Tree Unit) possibly furtherly split into smaller Coding Units (CU) as depicted in FIG. 1.

For coding a CU, a prediction block (PU=Prediction Unit) is built from neighboring reconstructed samples (intra prediction) or from previously reconstructed samples of pictures stored in the Decoded Pictures Buffer (DPB) (inter-prediction). Next, the residual samples calculated as the difference between original samples and PU samples, are transformed, quantized and entropy coded.

In inter-prediction, motion compensated temporal prediction is employed to exploit the redundancy that exists between successive pictures of a video. To do so, a motion vector is associated to the PU and a reference index 0 (refIdx0) indicating which reference picture of LIST_0 to use are used.

Local Illumination Compensation

In the Joint Exploration Model (JEM) and in the VVC reference software developed by the JVET (Joint Video Exploration Team) group, some additional temporal prediction tools with associated parameters determined at the decoder side is are under study, include the Local Illumination Compensation (LIC). Basically, the purpose of LIC is to compensate for illumination change which may occur between a predicted block and its reference block employed through motion compensated temporal prediction.

Figure 2:
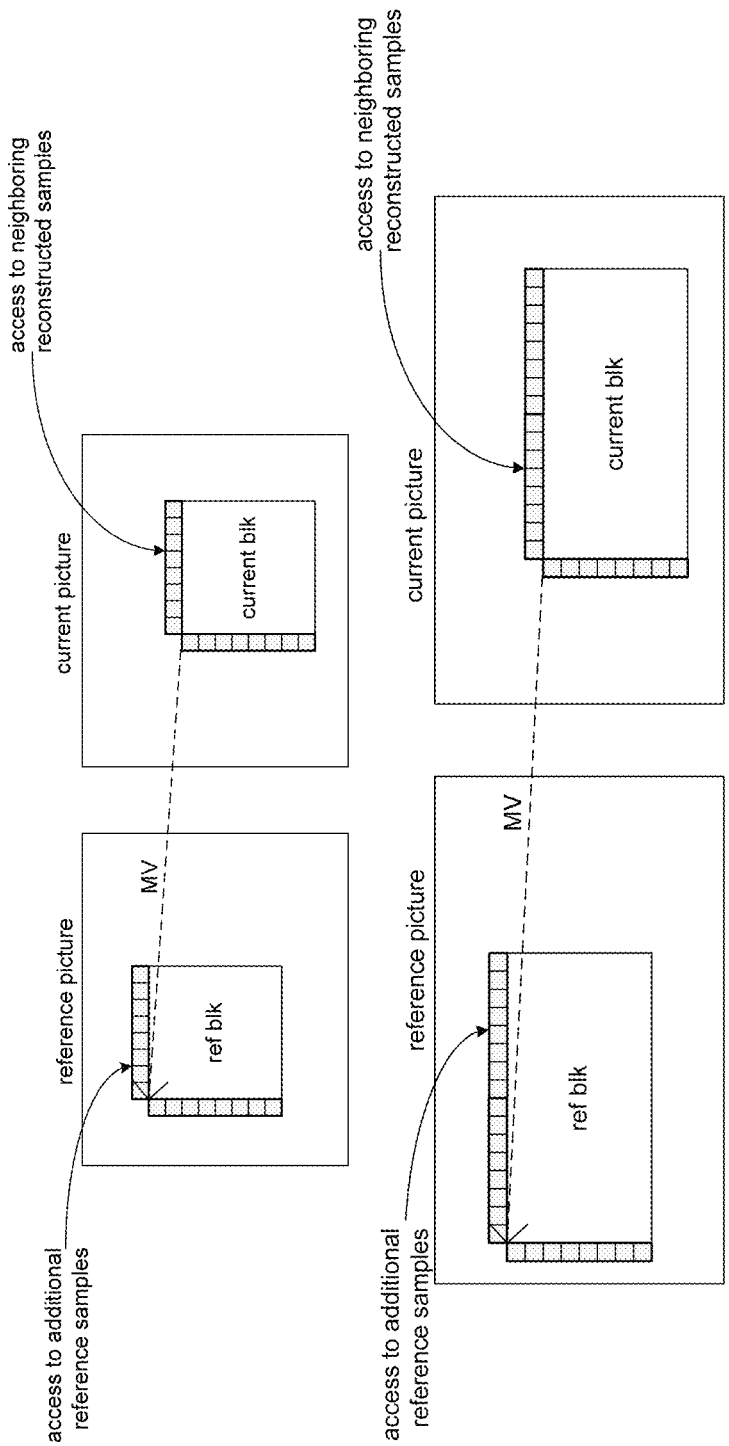
FIG. 2 illustrates in JEM, LIC parameters are derived from neighboring reconstructed samples and the corresponding reference samples translated with MV (top: square CU; bottom: rectangle CU).

The use of LIC is typically signaled on the CU level, through a flag (LIC flag) associated to each coding unit (CU) coded in inter mode. When this tool is activated, the decoder computes some prediction parameters based on some reconstructed picture samples, localized on the left and/or on the top of the current block to be predicted and reference picture samples localized on the left and/or on the top of the motion compensated block (FIG. 2). In the considered prior art codec (JEM), the use of LIC for a given block depends on a flag associated to this block, called the LIC flag. The LIC process is performed for all the image components (e.g. luminance, chrominance components).

In the following, we will call "L-shape" associated to the current block, the set composed of the samples situated on the row above the current block and/or of the samples situated on the column at the left of the current block, as depicted in grey in FIG. 2. Another proposal would be to discard some reference samples (for example, use only reference samples from coding units/blocks coded in inter coding mode).

LIC Flag Inheritance

Figure 3:
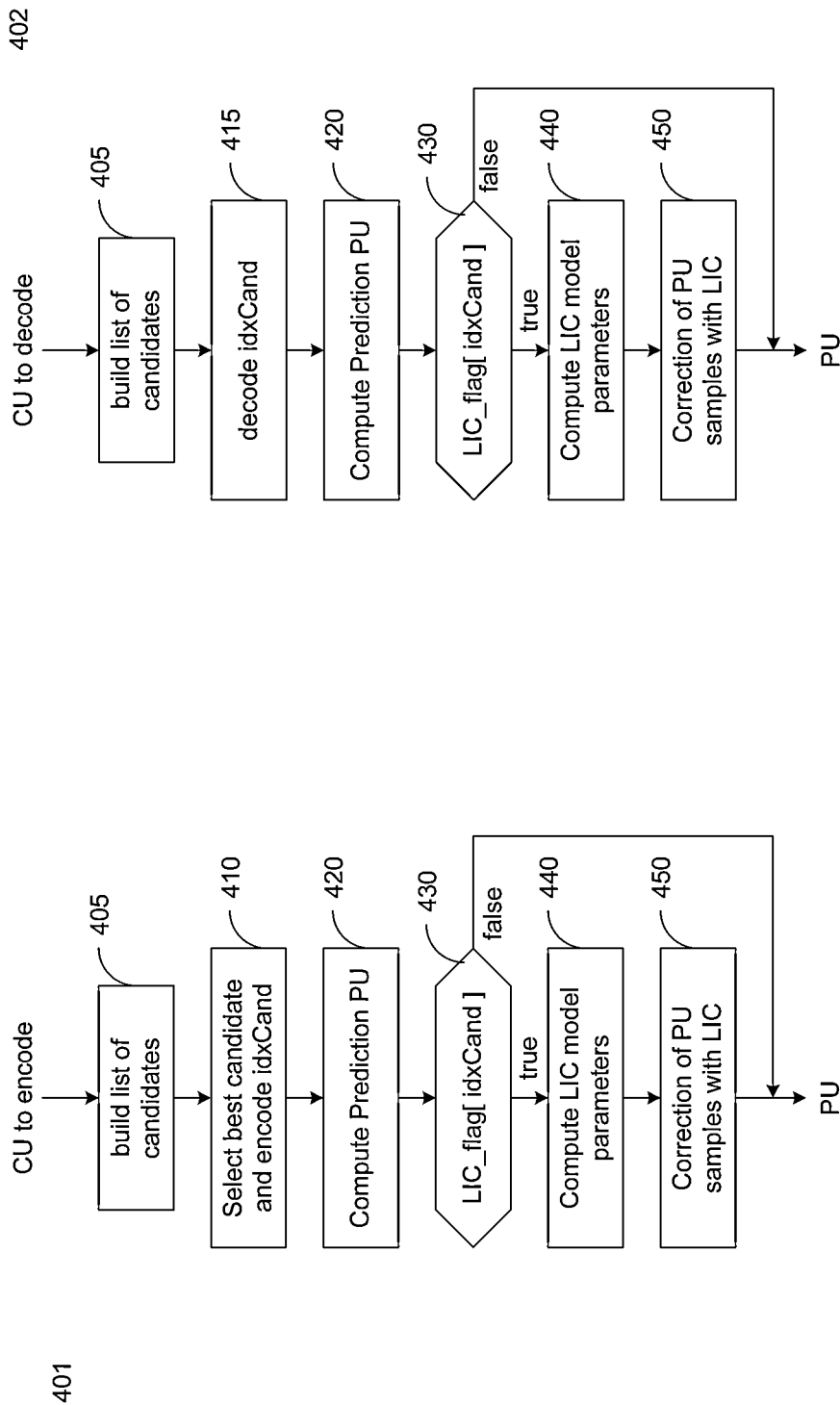
FIG. 3 illustrates The LIC flag inference process in case of merge mode at the encoder (left) and decoder (right).

The LIC flag may be either explicitly coded or inherited. When it is inherited, the LIC flag is deduced from previously coded parameters such as the previously reconstructed LIC flag values, as depicted in FIG. 3 for the encoder (401) and the decoder (402).

In merge or skip modes, a list of parameters candidates is built (410). The parameters may include MV, reference index, uni or bi-prediction, LIC-flag. If the LIC-flag is true (430), the LIC process applies: LIC parameters are derived (440) and applied (450) on the prediction PU samples (420).

LIC Model

In state-of-art approaches, the LIC model is based on a simple linear correction applied on the regular current block prediction (Equation 1).

$$Y_{corr}(X) = a \cdot Y_{pred}(X) + b \qquad \text{Equation 1. linear LIC model.}$$

where: $Y_{pred}(X)$ is the prediction sample value situated at position x,
$Y_{corr}(X)$ is the corrected prediction sample value situated at position x,
(a,b) are the LIC parameters (sometimes called scale and offset).

However, the described embodiments are not limited to this simple model. For example, other models such as ($Y_{corr}=a \cdot (Y_{pred})^2 + b \cdot Y_{pred} + c$) or ($Y_{corr} = a \cdot \log(Y_{pred}) + b$) could be used for example.

LIC Parameters Estimation

In case of the standard LIC model (Equation 1), the LIC parameters (a,b) are weight and offset can be determined based on the minimization of an error between current samples and linearly modified reference samples, which is defined as follows:

$$dist = \sum_{r \in Vcur, s \in Vref} (rec\_cur(r) - a.rec\_ref(s) - b)^2 \qquad \text{Equation 2}$$

LIC model distortion.

where: rec_cur(r) is a neighboring reconstructed sample in current picture (FIG. 2—right)
rec_ref(s) is a reference sample built with MC from reference picture (FIG. 2—left), with s=r+mv
rec_cur(r) and rec_ref(r) are co-located samples in the reconstructed and reference L-shape respectively.

The value of (a,b) are obtained using a least square minimization (LSM) (Equation 3):

$$a = \left( \frac{\sum ref(s) \times cur(r) - \frac{\sum ref(s) \times \sum cur(r)}{N}}{\sum cur(r)^2 - \frac{\sum ref(s) \times \sum cur(r)}{N}} \right) \qquad \text{Equation 3}$$

$$b = \frac{\sum cur(r)}{N} - a \times \frac{\sum ref(s)}{N}$$

derivation of (a, b) LIC parameters.

Note that the value of N may be furtherly adjusted (e.g. reduced incrementally) in order to the sum terms in Equation 3 to remain below the maximum integer storage number value allowed (e.g. $N < 2^{16}$). Also the sub-sampling of the top and left samples set can be incremented for large blocks.

Once the LIC parameters are obtained by the encoder or the decoder for the current CU, then the prediction pred (current_block) of current CU consists in the following (uni-directional prediction case):

$$\text{pred(current\_block)} = a \times \text{ref\_block} + b \qquad \text{(Equation 1)}$$

Where current_block is the current block to predict, pred (current_block) is the prediction of the current block, and ref_block is the reference block built with regular motion compensation (MC) process and used for the temporal prediction of the current block.

Figure 4:
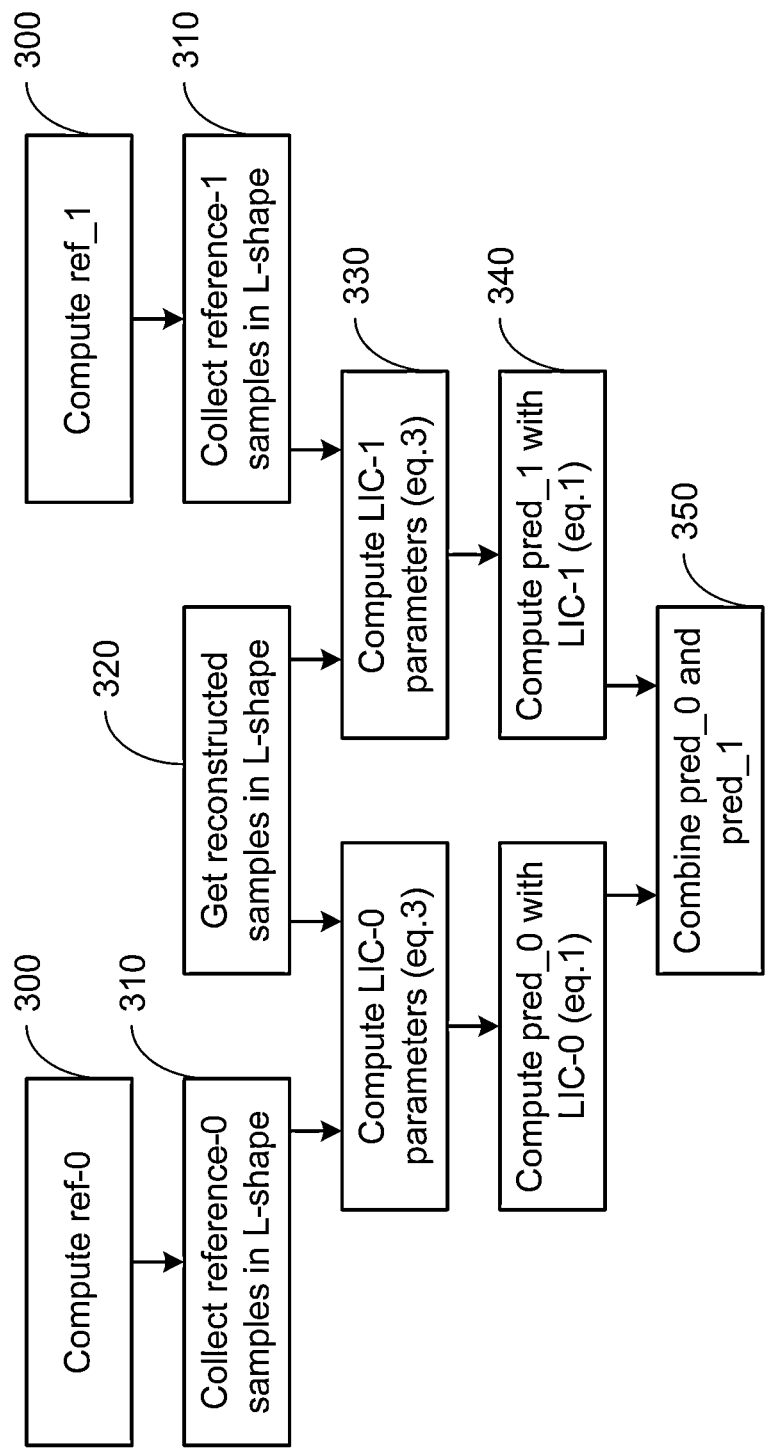
FIG. 4 illustrates derivation of LIC parameters and application for each prediction L0 and L1.

In case of bi-prediction, the LIC process is applied twice, first on reference 0 prediction (LIST-0) and second on the reference 1 prediction (LIST_1) (FIG. 4). Next, the two predictions are combined together as usual using default weighting (P=(P0+P1+1)>>1) or bi-prediction weighted averaged (BPWA): P=(g0.P0+g1.P1+(1<<(s−1)))>>s). This method is called method-a.

Figure 5:
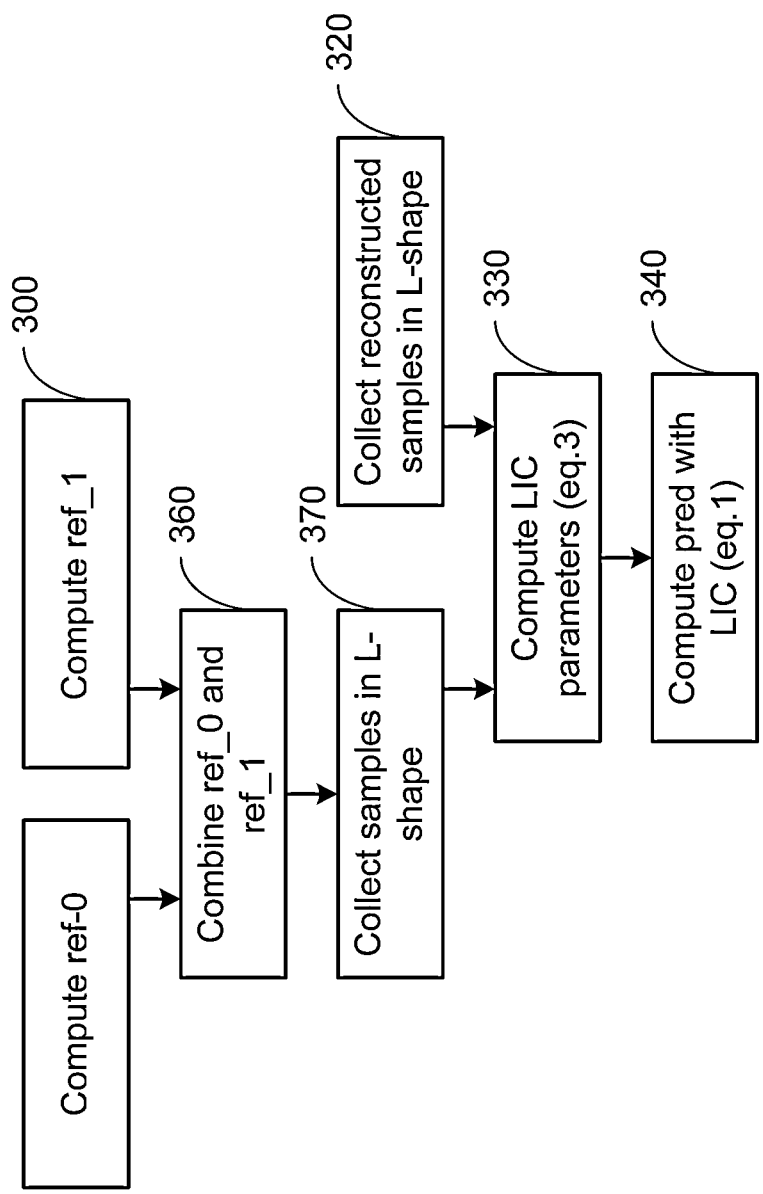
FIG. 5 illustrates derivation of LIC parameters and application to the combined prediction from L0 and L1.

In a variant (method-b), in case of bi-prediction, the regular predictions are combined first and next one single LIC process is applied (FIG. 5).

Default LIC Model

The estimation/computation of the LIC parameters may lead to values corresponding to Identity. In this case, one has $Y_{corr}(x)=Y_{pred}(x)$ for all the "x" samples of the PU block. In case of LIC model described by equation-1, this corresponds to (a;b)=(1;0). Typically, this may happen when there is no illumination change between the current and the reference block, or when the "L-shape" is not available (e.g. CU at the top-left picture/slice border), or when the range of values is too narrow to estimate LIC parameters. In the following, we will denote "default model" the LIC model which does not modify the PU sample values.

Figure 6:
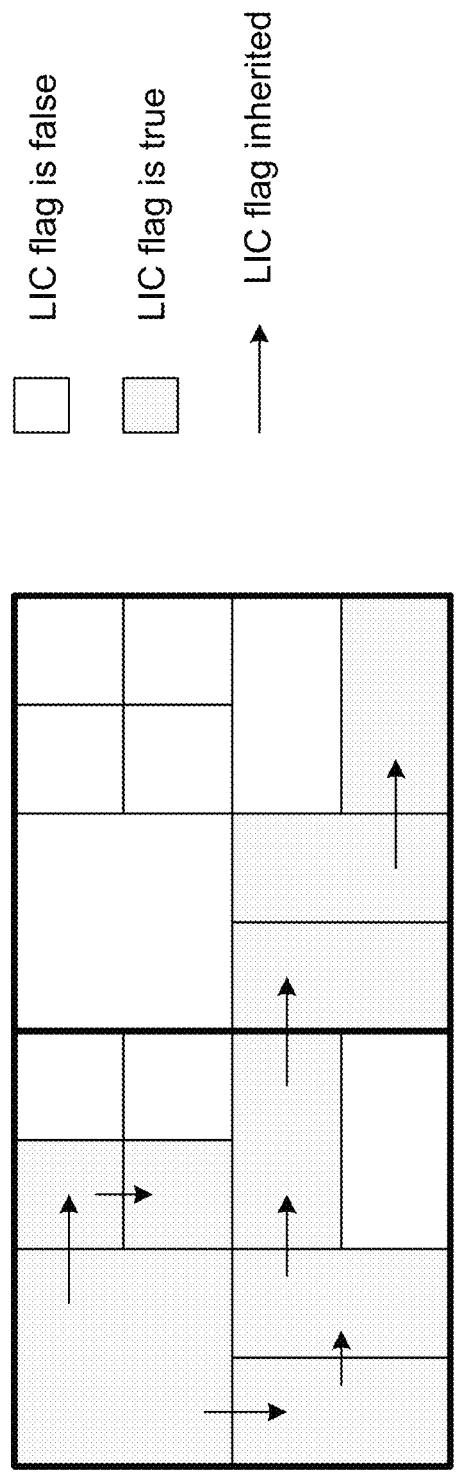
FIG. 6 illustrates how the LIC-flag may be inherited multiple times successively.

The LIC flag indicates whether the LIC process applies for current CU for all the components. However, it may happen the estimated LIC parameters are defaults for at least one component. In case of the LIC flag is explicitly coded, the encoder may choose the value of the LIC-flag (true or false) depending on the best rate-distortion trade-off (410). However, when the LIC-flag is inherited, the encoder cannot control the LIC process easily, since the LIC-flag may be inherited multiple times successively, as depicted in FIG. 6.

The invention improves the derivation of the local illumination compensation (LIC) flag parameter by deriving a component based LIC flag. Additionally, the LIC flag inheritance may be conditioned to the actual derived LIC parameters values.

Embodiment-1

One defines one LIC-flag per component. In case of $N_c$ components (e.g. $N_c$=3 for YUV or RGB) and LIC flag is explicitly coded (e.g. AMVP mode), one encodes $N_c$ LIC flags.

In a variant, one encodes one single LIC-flag value and the per-component LIC-flag are equal to the coded LIC-flag.

Embodiment-2 (can be Combined with Embodiment 1)

One defines another "LIC_flag" that we denote "LIC_flag_out". The regular "LIC_flag" indicates whether the LIC process (LIC parameters derivation and PU samples correction) applies for current CU. The "LIC_flag_out" indicates the value of LIC flag that can be inherited by another CU (550).

In a variant, one defines one value of "LIC_flag_out" per component C. The derivation of "LIC_flag_out[C]" (570) is function of the computed LIC parameters for the component C. For example, if the computed LIC parameters for component C are defaults, then LIC_flag_out[C]=false, else LIC_flag_out[C]=true. If the regular "LIC flag" was false, then "LIC_flag_out" is false.

In a variant, in case of LIC model given by (eq.1), if the scale value is zero, then LIC_flag_out[C]=false.

Embodiment-2.1 (can be Combined with Embodiment 1, Embodiment 2)

Figure 10:
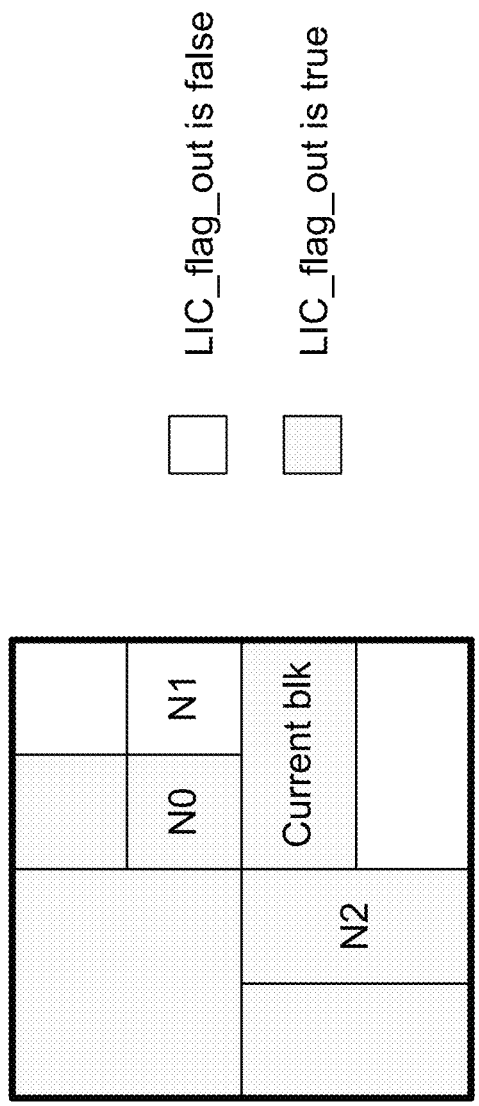
FIG. 10 illustrates the LIC-flag may be inherited multiple times successively.

If the regular "LIC flag" of the current block was true, the derivation of "LIC_flag_out" can be function of the previous neighboring's "LIC_flag_out" information. For example, the "majority", if most "LIC_flag_out" of the coded neighboring blocks were true, then "LIC_flag_out" of the current block is set to true. As depicted in FIG. 10, the "LIC_flag_out" of neighbors N0 and N2 were true, while another neighbor N1's "LIC_flag_out" was false, the "LIC_flag_out" of current block is derived as true, which is the major value among its neighbors.

Embodiment-3 (can be Combined with Embodiment 1, Embodiment 2)

In another variant of emb-2, if the values of the LIC patameters are close to default, then LIC_flag_out[C]=false. For example, in case of LIC model (eq.1), "close to default" (default a is 1 (ie., 32>>5) can correspond to:

abs(a−1)<th_a and abs(b)<th_b where (th_a;th_b) are pre-determined values (e.g. 0.1 and 10<<(bitdepth_8))

Embodiment-4 (can be Combined with Embodiments 1, 2 and 3)

In another variant, the derivation of "LIC_flag_out[C2]" (570) is function of the computed LIC parameters for the component C1, with C1≠C2. For example, C1=luma and C2 is one chroma component (e.g. Cb or Cr).

Embodiment-5 (can be Combined with Embodiments 1, 2, 3, and 4)

One defines one value of "LIC_flag_out" per component type T. For example, one for Luma, and one for Chroma (components Cb and Cr).

The "LIC flag" is decoded or inferred by component type. "LIC_flag_out" is used as previously for the Luma component, and for the chroma components, "LIC_flag_out" is inferred to false if at least one of the computed LIC parameters for chroma Cb or Cr is default (or close to default). In a variant, the chroma components "LIC_flag_out" is inferred to false if the computed LIC parameters for chroma Cb and Cr are both default (or close to default, emb-3).

Embodiment-6 (Embodiments 1, 2, or 3)

Figure 11:
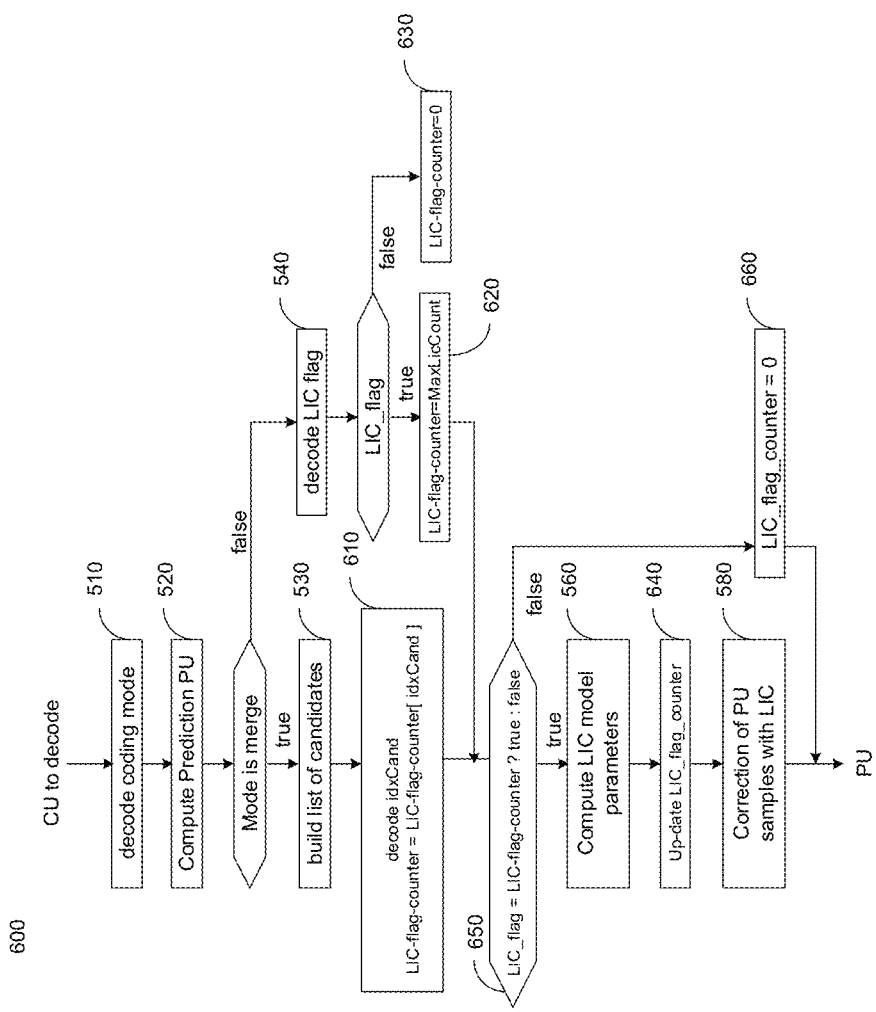
FIG. 11 illustrates a flow diagram of another embodiment for decoding a video block under the present principles.

This embodiment is depicted in FIG. 11.

The "LIC_flag" is associated with a "LIC_flag_counter". When combined with emb-1, there is one "LIC_flag_counter[C]" per component. The value of "LIC_flag_counter" is initialized when decoding a CU with LIC flag explicitly coded. If "LIC_flag=true", then "LIC_flag_counter" is initialized to "MaxLicCount" (e.g. "MaxLicCount=2")(620). If "LIC_flag=false", then "LIC_flag_counter" is initialized to 0 (630). In merge mode, the "LIC_flag_counter" is inherited (610).

(a) When combined with emb-2 or emb-3, if the LIC parameters are (close to) default, then the "LIC_flag_counter" is decremented (except if "LIC_flag_counter" is zero) (640).

A CU coded in merge mode inherits the "LIC_flag_counter". If "LIC_flag_counter=0" then LIC is disabled for the CU (650). In a variant, if the CU inherits "LIC_flag", then "LIC_flag_counter" is decremented (b). One have (a) only, (b) only or (a)+(b) (in this case, "LIC_flag_counter" can b decremented twice).

Figure 12:
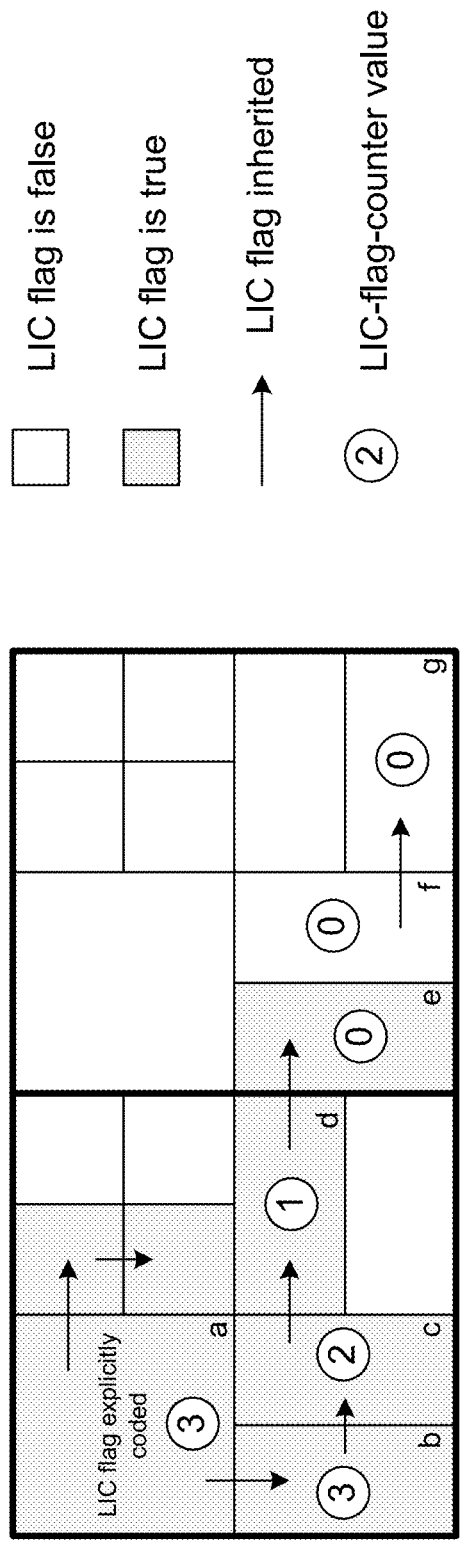
FIG. 12 illustrates another example of the LIC-flag may be inherited multiple times successively.

In example of FIG. 12, "MaxLicCount=3".
a. The CUa has "LIC_flag" explicitly coded and is equal to true. The derived LIC parameters are not default, then "LIC_flag_counter" is equal to 3.
b. The CUb is merge and inherits "LIC_flag_counter" from upper CU (CUa). The derived LIC parameters are not default, then "LIC_flag_counter" remains equal to 3.
c. The CUc is merge and inherits "LIC_flag_counter" from left CU (CUb). The derived LIC parameters are default, then "LIC_flag_counter" is decremented and is equal to 2.
d. The CUd is merge and inherits "LIC_flag_counter" from left CU (CUc). The derived LIC parameters are default, then "LIC_flag_counter" is decremented and is equal to 1.
e. The CUe is merge and inherits "LIC_flag_counter" from left CU (CUd). The derived LIC parameters are default, then "LIC_flag_counter" is decremented and is equal to 0.
f. The CUf is merge and inherits "LIC_flag_counter" from left CU (CUe). "LIC_flag_counter" is equal to 0, then LIC is disabled ("LIC_flag"=false).
g. The CUg is merge and inherits "LIC_flag_counter" from left CU (CUf). "LIC_flag_counter" is equal to 0, then LIC is disabled ("LIC_flag"=false).

Embodiment-7 (Embodiment-1)

In this embodiment, there is no LIC for chroma components. "LIC_flag" and "LIC_flag_out" for chroma components are always inferred to false.

Embodiment-8

In this embodiment, there is no LIC propagation (inheritance) for chroma components. "LIC_flag" is coded in the bitstream for luma and Chroma components, and LIC is applied as usual. But "LIC_flag_out" is always inferred to false for chroma components, regardless LIC parameters values. Consequently, LIC for chroma components is always false for Merged blocks.

Note that the variants one single "LIC_flag", one "LIC_flag" per component or one "LIC_flag" per component type are possible with this embodiment. In the case of one single "LIC_flag", one flag is decoded per CU, and the "LIC_flag_out" is always false for chroma components and as previously described for the luma component.

Figure 15:
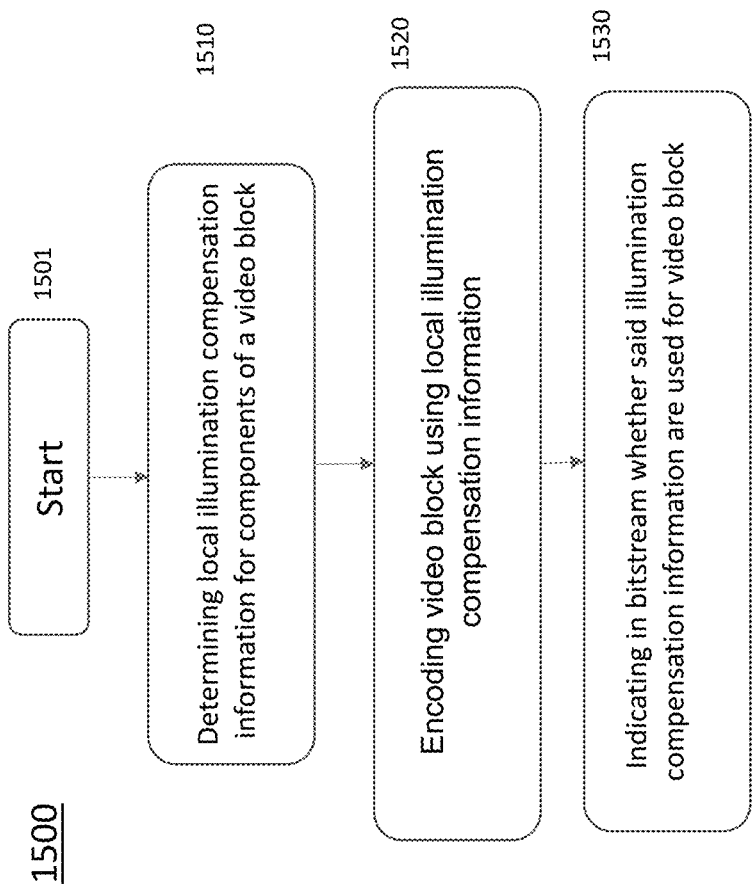
FIG. 15 illustrates one embodiment of a method for encoding video using at least one illumination compensation flag.

One embodiment of a method 1500 under the general aspects described here is shown in FIG. 15. The method commences at start block 1501 and control proceeds to block 1510 for determining local illumination compensation information to be used for one or more video components of a video block. Control proceeds from block 1510 to block 1520 for encoding the video block using the local illumination compensation information. Control proceeds from block 1520 to block 1530 for indicating in a bitstream whether said illumination compensation information are used for the video block.

Figure 14:
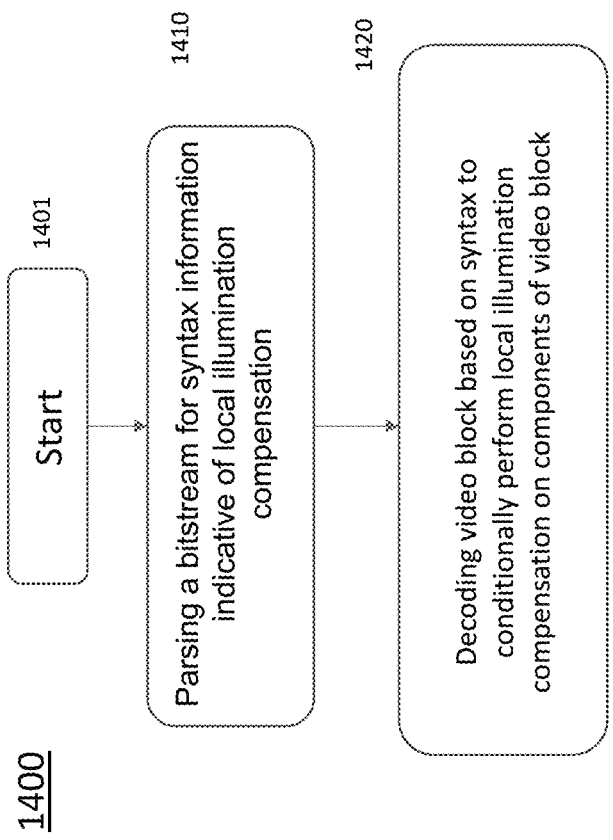
FIG. 14 illustrates one embodiment of a method for decoding video using at least one illumination compensation flag.

One embodiment of a method 1400 under the general aspects described here is shown in FIG. 14. The method commences at start block 1401 and control proceeds to block 1410 for parsing a bitstream for syntax information indicative of local illumination compensation. Control proceeds from block 1410 to block 1420 for decoding at least one video block in said bitstream based on said syntax to conditionally perform local illumination compensation on components of said one video block.

FIG. 16 shows one embodiment of an apparatus 1600 for compressing, encoding or decoding video using coding or decoding tools. The apparatus comprises Processor 1610 and can be interconnected to a memory 1620 through at least one port. Both Processor 1610 and memory 1620 can also have one or more additional interconnections to external connections.

Processor 1610 is also configured to either insert or receive information in a bitstream and, either compressing, encoding or decoding using various coding tools.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 7:
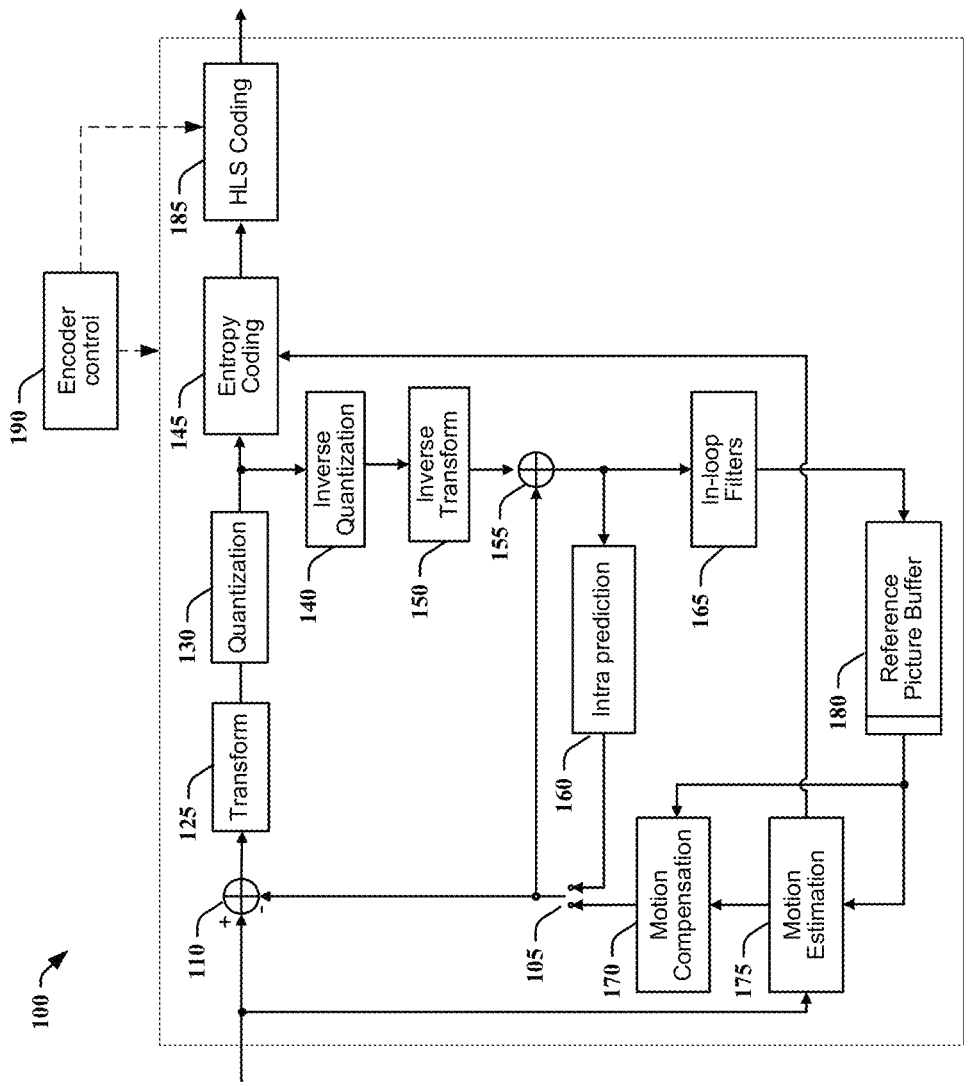
FIG. 7 illustrates a generic video compression scheme.
Figure 8:
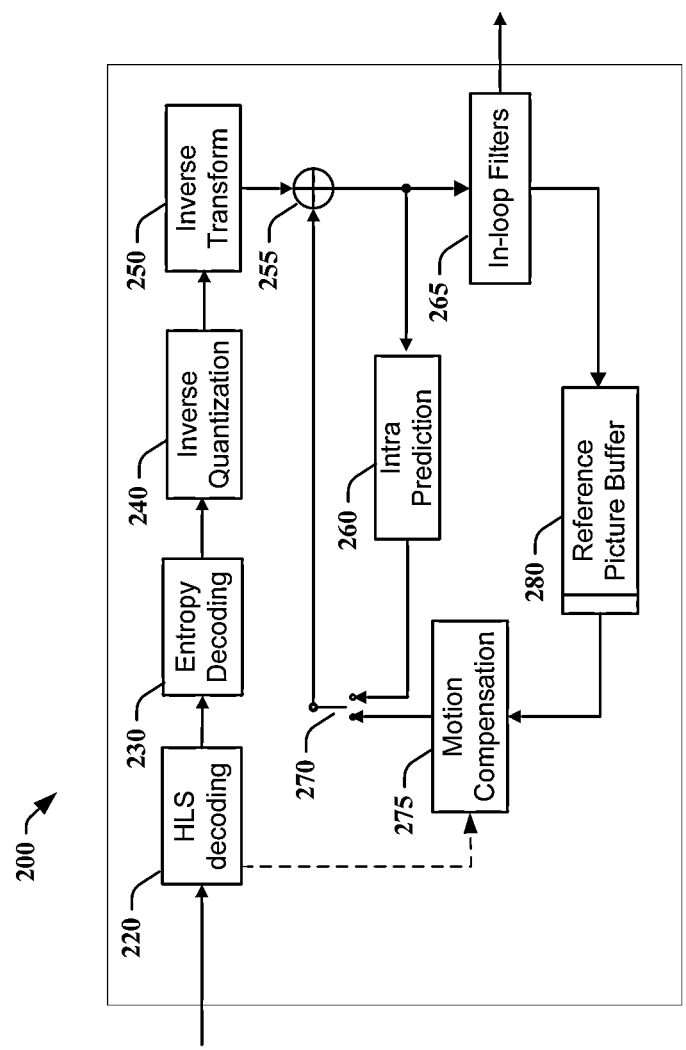
FIG. 8 illustrates a generic video decompression scheme.
Figure 9:
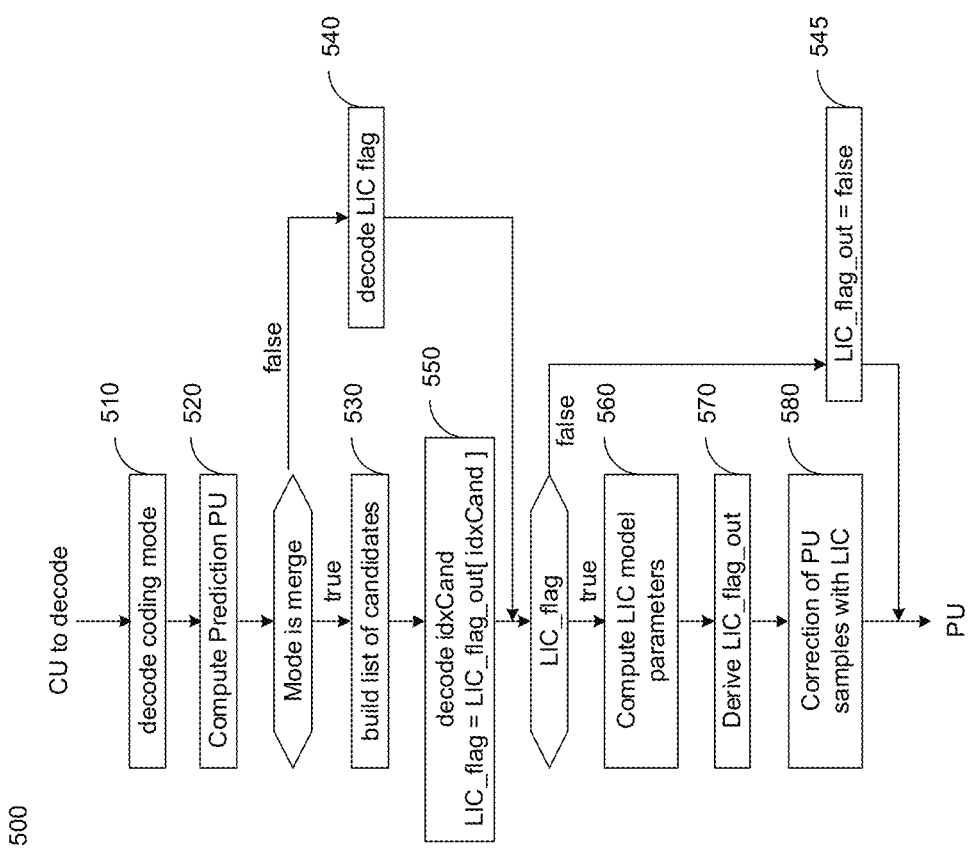
FIG. 9 illustrates a flow diagram for one embodiment for decoding a video block under the present principles.
Figure 13:
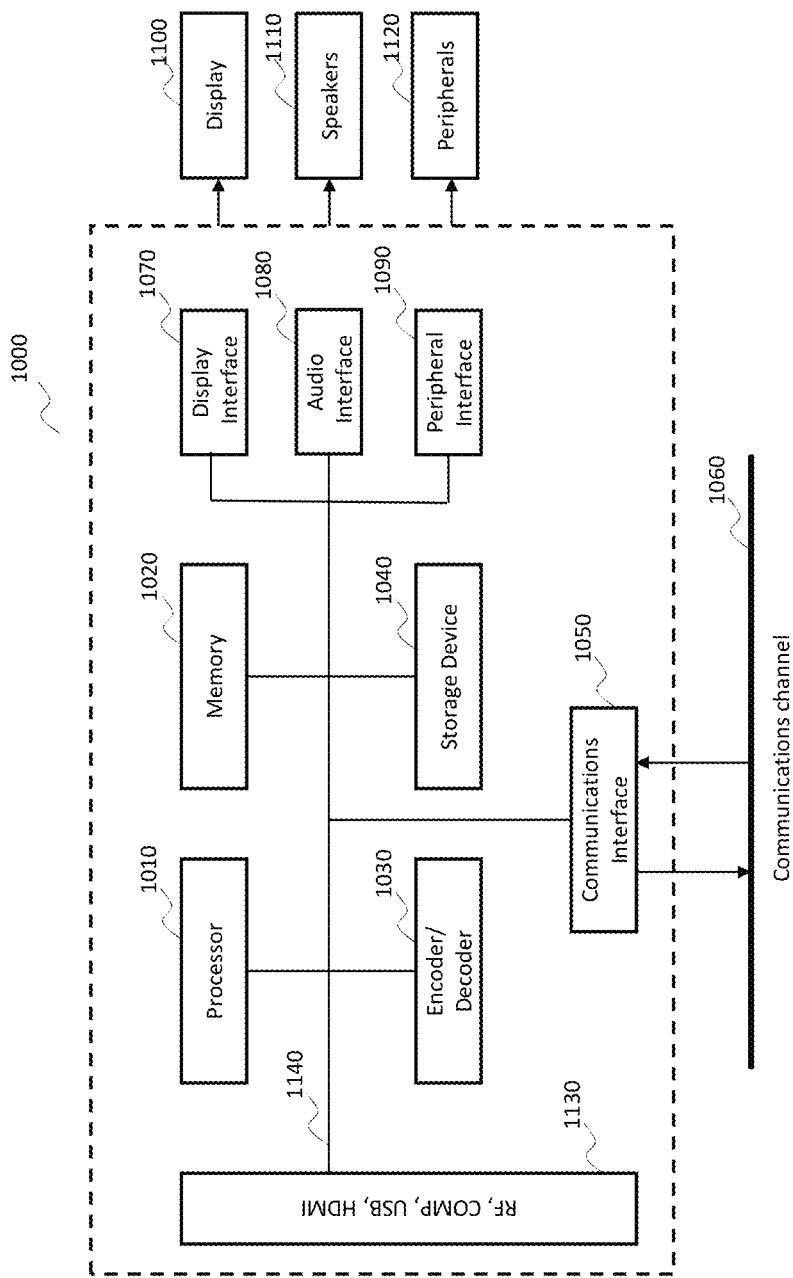
FIG. 13 a processor based system for encoding/decoding.

The aspects described and contemplated in this application can be implemented in many different forms. FIGS. 7, 8, and 13 provide some embodiments, but other embodiments are contemplated and the discussion of FIGS. 7, 8, and 13 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 7 and FIG. 8. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 7 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 8 illustrates a block diagram of a video decoder 200. In the decoder 200, a bitstream is decoded by the decoder elements as described below. Video decoder 200 generally performs a decoding pass reciprocal to the encoding pass as described in FIG. 7. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 13 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device).

System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 13, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distotion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal.

Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination.

Further, embodiments can include one or more of the following features, devices, or aspects, alone or in any combination, across various claim categories and types:

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
    obtaining a first local illumination compensation (LIC) flag, for a current image block, indicating that local illumination compensation applies to the current image block;
    obtaining, for at least one component of the current image block, LIC model parameters;
    decoding the current image block using the LIC model parameters; and
    deriving a second LIC flag for at least one component of the current image block based on at least one parameter among the LIC model parameters obtained for the at least one component or based on at least one parameter among LIC model parameters obtained for another component different from the at least one component, the second LIC flag being different from the first LIC flag and being usable by another image block different from the current image block to indicate whether local illumination compensation applies on the another image block.

2. The method of claim 1, wherein deriving the second LIC flag comprises setting the second LIC flag to false in a case where the at least one parameter among the LIC model parameters is within a range of default values.

3. The method of claim 1, wherein deriving the second LIC flag comprises deriving one second LIC flag for a luminance component and another second LIC flag for chrominance components.

4. The method of claim 1, wherein deriving the second LIC flag comprises setting the second LIC flag to false in a case where, the LIC model parameters comprising a LIC scale, the LIC scale is equal to 0.

5. A non-transitory computer-readable storage medium having stored instructions that, when executed by a processor, cause the processor to perform the method of claim 1.

6. An apparatus, comprising one or more processors and at least one memory coupled to the one or more processors, wherein the one or more processors are configured to perform:
    obtaining a first local illumination compensation (LIC) flag, for a current image block, indicating that local illumination compensation applies to the current image block;
    obtaining, for at least one component of the current image block, LIC model parameters;
    decoding the current image block using the LIC model parameters; and
    deriving a second LIC flag for at least one component of the current image block based on at least one parameter among the LIC model parameters obtained for the at least one component or based on at least one parameter among LIC model parameters obtained for another component different from the at least one component, the second LIC flag being different from the first LIC flag and being usable by another image block different from the current image block to indicate whether local illumination compensation applies on the another image block.

7. The apparatus of claim 6, wherein deriving the second LIC flag comprises setting the second LIC flag to false in a case where the at least one parameter among the LIC model parameters is within a range of default values.

8. The apparatus of claim 6, wherein deriving the second LIC flag comprises deriving one second LIC flag for a luminance component and another second LIC flag for chrominance components.

9. The apparatus of claim 6, wherein deriving the second LIC flag comprises setting the second LIC flag to false in a case where, the LIC model parameters comprising a LIC scale, the LIC scale is equal to 0.

10. A method, comprising:
    obtaining a first local illumination compensation (LIC) flag, for a current image block, indicating that local illumination compensation applies to the current image block;
    obtaining, for at least one component of the current image block, LIC model parameters;
    encoding the current image block using the LIC model parameters; and
    deriving a second LIC flag for at least one component of the current image block based on at least one parameter among the LIC model parameters obtained for the at least one component or based on at least one parameter among LIC model parameters obtained for another component different from the at least one component, the second LIC flag being different from the first LIC flag and being usable by another image block different from the current image block to indicate whether local illumination compensation applies on the another image block.

11. The method of claim 10, wherein deriving the second LIC flag comprises setting the second LIC flag to false in a case where the at least one parameter among the LIC model parameters is within a range of default values.

12. The method of claim 10, wherein deriving the second LIC flag comprises deriving one second LIC flag for a luminance component and another second LIC flag for chrominance components.

13. The method of claim 10, wherein deriving the second LIC flag comprises setting the second LIC flag to false in a case where, the LIC model parameters comprising a LIC scale, the LIC scale is equal to 0.

14. A non-transitory computer-readable storage medium having stored instructions that, when executed by a processor, cause the processor to perform the method of claim 10.

15. An apparatus, comprising one or more processors and at least one memory coupled to the one or more processors, wherein the one or more processors are configured to perform:
    obtaining a first local illumination compensation (LIC) flag, for a current image block, indicating that local illumination compensation applies to the current image block;
    obtaining, for at least one component of the current image block, LIC model parameters;
    encoding the current image block using the LIC model parameters; and
    deriving a second LIC flag for at least one component of the current image block based on at least one parameter among the LIC model parameters obtained for the at least one component or based on at least one parameter among LIC model parameters obtained for another component different from the at least one component, the second LIC flag being different from the first LIC flag and being usable by another image block different from the current image block to indicate whether local illumination compensation applies on the another image block.

16. The apparatus of claim 15, wherein deriving the second LIC flag comprises setting the second LIC flag to false in a case where the at least one parameter among the LIC model parameters is within a range of default values.

17. The apparatus of claim 15, wherein deriving the second LIC flag comprises deriving one second LIC flag for a luminance component and another second LIC flag for chrominance components.

18. The apparatus of claim 15, wherein deriving the second LIC flag comprises setting the second LIC flag to false in a case where, the LIC model parameters comprising a LIC scale, the LIC scale is equal to 0.

* * * * *